United States Patent [19]
Koch et al.

[11] Patent Number: 5,071,924
[45] Date of Patent: * Dec. 10, 1991

[54] THERMOPLASTIC MOLDING MATERIALS BASED ON POLYAMIDE BLENDS

[75] Inventors: Eckhard M. Koch, Fussgoenheim; Gerhard Heinz, Weisenheim; Walter Goetz, Ludwigshafen; Gunter Pipper, Duerkheim, all of Fed. Rep. of Germany

[73] Assignee: BASF Aktiengesellschaft, Ludwigshafen, Fed. Rep. of Germany

[*] Notice: The portion of the term of this patent subsequent to Jul. 7, 1989 has been disclaimed.

[21] Appl. No.: 376,502

[22] Filed: Jul. 7, 1989

[30] Foreign Application Priority Data

Jul. 14, 1988 [DE] Fed. Rep. of Germany ....... 3823803

[51] Int. Cl.$^5$ ............................................. C08L 77/00
[52] U.S. Cl. ..................................... 525/432; 525/66; 525/183; 525/184; 525/182
[58] Field of Search ............................... 525/432, 184

[56] References Cited

U.S. PATENT DOCUMENTS

| 3,963,799 | 6/1976 | Starkweather | 260/857 L |
| 4,173,556 | 11/1979 | Coran et al. | 260/30.8 R |
| 4,197,379 | 5/1980 | Coran et al. | 525/142 |
| 4,486,507 | 12/1984 | Schumacher | 428/476.1 |

FOREIGN PATENT DOCUMENTS

| 0034704 | 9/1982 | European Pat. Off. | |
| 0124451 | 11/1984 | European Pat. Off. | |
| 62-45652 | 2/1987 | Japan | 525/432 |
| 62-127346 | 6/1987 | Japan | 525/432 |

Primary Examiner—Ana L. Carrillo
Attorney, Agent, or Firm—Oblon, Spivak, McClelland, Maier & Neustadt

[57] ABSTRACT

Thermoplastic molding materials contain, as essential components,

A) 20-98% by weight of a partly aromatic amide copolymer essentially consisting of
  a$_1$) 40-90% by weight of units derived from terephthalic acid and hexamethylenediamine,
  a$_2$) 0-50% by weight of units derived from ε-caprolactam and
  a$_3$) 0-60% by weight of units derived from adipic acid and hexamethylenediamine, components a$_2$) and/or a$_3$) accounting altogether for not less than 10% by weight of the total number of units, B) 2-80% by weight of a partly crystalline thermoplastic polyamide which differs from A)

and furthermore

C) 0-50% by weight of an elastomeric impact modifier and

D) 0-60% by weight of fibrous or particulate fillers or a mixture of these.

5 Claims, 1 Drawing Sheet

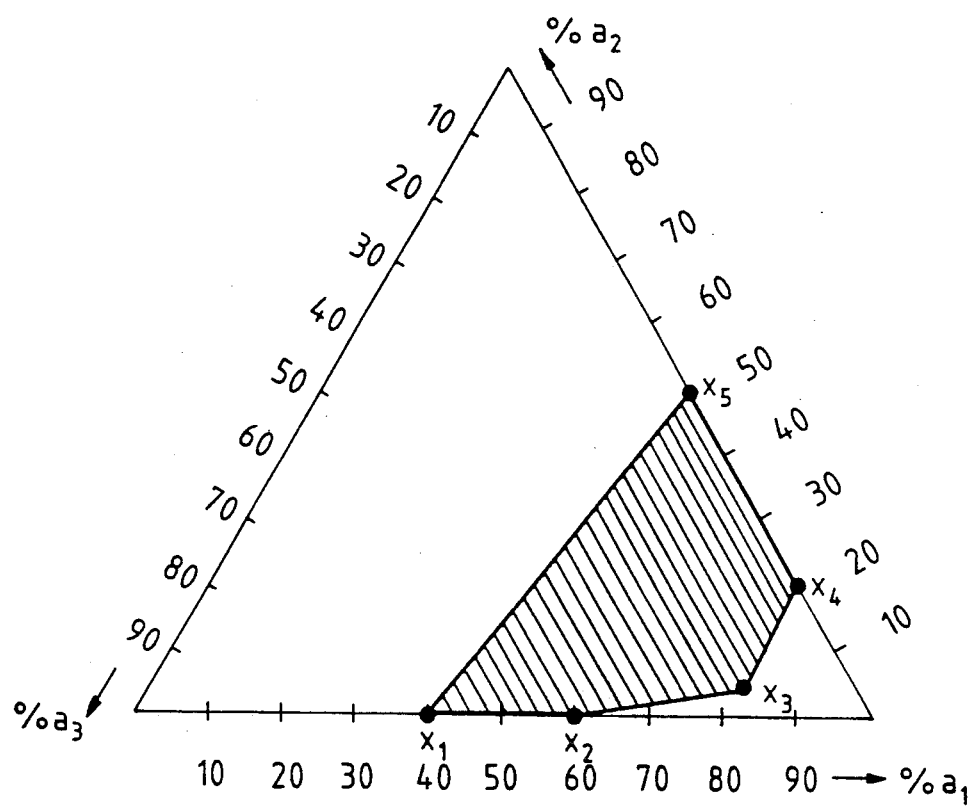

THERMOPLASTIC MOLDING MATERIALS BASED ON POLYAMIDE BLENDS

The present invention relates to thermoplastic molding materials containing, as essential components, A) 20-98% by weight of a partly aromatic amide copolymer essentially consisting of
- $a_1$) 40-90% by weight of units derived from terephthalic aid and hexamethylenediamine,
- $a_2$) 0-50% by weight of units derived from $\epsilon$-caprolactam and
- $a_3$) 0-60% by weight of units derived from adipic acid and hexamethylenediamine, components $a_2$) and/or $a_3$) accounting altogether for not less than 10% by weight of the total number of units, B) 2-80% by weight of a partly crystalline thermoplastic polyamide which differs from A)
and furthermore
C) 0-50% by weight of an elastomeric impact modifier and
D) 0-60% by weight of fibrous or particulate fillers or a mixture of these.

The present invention furthermore relates to the use of such thermoplastic molding materials for the production of fibers, films or moldings, and to the moldings obtainable from the thermoplastic molding materials as essential components.

Polyamides such as poly-$\epsilon$-caprolactam and polyhexamethyleneadipamide are among the engineering plastics which have long been known and ar used in many areas. They generally have great harness and rigidity and good heat distortion resistance and are furthermore resistant to abrasion and wear and also resistant to many chemicals.

For some intended uses, however, it would be desirable for the heat distortion resistance of the polyamides to be further improved without the remaining mechanical properties being adversely affected.

These requirements are met by some amide copolymers in which some of the aliphatic units have been replaced by aromatic units, for example amide copolymers obtained from adipic acid, terephthalic acid, hexamethylenediamine and $\epsilon$-caprolactam in any desired combination.

Processs for the preparation of such polyamides are described in, for example, German Patent 929,151, GB-A-1 114 541, DE-A-16 20 997 and DE-A 34 07 492 and the earlier patent application P 37 23 688.1.

However, such partly aromatic amide copolymers frequently have unsatisfactory rigidity.

European Patent 34,704 describes blends of poly-$\epsilon$-caprolactam and polyhexamethyleneadipamide, which have certain advantages over the two polyamides themselves with regard to toughening but still have unsatisfactory distortion resistance.

The same applies to the toughened blends of poly-$\epsilon$-caprolactam and polyhexamethyleneadipamide which are obtained according to EP-A 124 451 and are prepared by a special process.

It is an object of the present invention to provide thermoplastic molding materials which are based on partly crystalline polyamides and have not only good heat distortion resistance but also good rigidity and a generally good property profile.

We have found that this object is achieved, according to the invention, by thermoplastic molding materials containing, as essential components, A) 20-98% by weight of a partly aromatic amide copolymer essentially consisting of
- $a_1$) 40-90% by weight of units derived from terephthalic acid and hexamethylenediamine,
- $a_2$) 0-50% by weight of units derived from $\epsilon$-caprolactam and
- $a_3$) 0-60% by weight of units derived from adipic acid and hexamethylenediamine, components $a_2$) and/or $a_3$) accounting altogether for not less than 10% by weight of the total number of units, B) 2-80% by weight of a partly crystalline thermoplastic polyamide which differs from A)
and furthermore
C) 0-50% by weight of an elastomeric impact modifier and
D) 0-60% by weight of fibrous or particulate fillers or a mixture of these.

Preferred materials of this type are described in detail below.

The novel thermoplastic molding materials contain, as component A), 20-98, preferably 50-95, in particular 60-90, by weight of a partly aromatic amide copolymer having the composition described below.

The partly aromatic amide copolymers A) contain, as component $a_1$), 40-90% by weight of units derived from terephthalic acid and hexamethylenediamine. A small proportion of the terephthalic acid, preferably not more than 10% by weight of the total amount of aromatic dicarboxylic acids used, can be replaced by isophthalic acid or other aromatic dicarboxylic acids, preferably those in which the carboxyl groups are in the para position.

In addition to the units derived from terephthalic acid and hexamethylenediamine, the partly aromatic amide copolymers contain units derived from $\epsilon$-caprolactam ($a_2$) and/or units derived from adipic acid and hexamethylenediamine ($a_3$).

The amount of units derived from $\epsilon$-caprolactam is not more than 50, preferably 20-50, in particular 25-40%, by weight, while the amount of units derived from adipic acid and hexamethylenediamine is not more than 60, preferably 30-60, in particular 35-55%, by weight.

The amide copolymers may contain both units of $\epsilon$-caprolactam and units of adipic acid and hexamethylenediamine; in this case, it is necessary to ensure that the amount of units which are free of aromatic groups is not less than 10, preferably not less than 20%, by weight.

The ratio of the units derived from $\epsilon$-caprolactam and those derived from adipic acid and hexamethylenediamine is not subject to any particular restrictions.

BRIEF DESCRIPTION OF THE DRAWING

Preferred amide copolymers are those whose composition lies within the pentagon fixed by the apices $X_1$ to $X_5$ in the ternary diagram, the points $X_1$ to $X_5$ being defined as follows:

$X_1$ 40% by weight of units $a_1$) 60% by weight of units $a_3$)

$X_2$ 60% by weight of units $a_1$) 40% by weight of units $a_3$)

$X_3$ 80% by weight of units $a_1$) 5% by weight of units $a_2$) 15% by weight of units $a_3$)

$X_4$ 80% by weight of units $a_1$) 20% by weight of units $a_2$)

X$_5$ 50% by weight of units a$_2$) 50% by weight of units a$_2$)

In the FIGURE, the pentagon defined by these points is shown in a ternary diagram.

Polyamides containing 50-80, in particular 60-75%, by weight of units derived from terephthalic acid and hexamethylenediamine (units a$_1$)) and 20-50, preferably 25-40%, by weight of units derived from ε-caprolactam (units a$_2$)) have proven particularly advantageous for many intended uses.

In addition to the units a$_1$) to a$_3$) described above, the novel partly aromatic amide copolymers can also contain minor amounts, preferably not more than 15, in particular not more than 10%, by weight of further polyamide building blocks, such as those known for other polyamides. These building blocks may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. Examples of suitable monomers of this type are suberic acid, azelaic acid, sebacic acid and isophthalic acid, as typical dicarboxylic acids, and 1,4-butanediamine, 1,5-pentanediamine, piperazine, 4,4'-diaminodicyclohexylmethane, 2,2-(4,4'-diaminodicyclohexyl)-propane and 3,3'-dimethyl-4,4'-diaminodicyclohexylmethane, as typical diamines, and capryllactam, enantholactam, omega-aminoundecanoic acid and laurolactam, as typical lactams and aminocarboxylic acids.

The melting points of the partly aromatic amide copolymers A) are from 260° C. to above 300° C., this high melting point also being associated with a high glass transition temperature of, as a rule, more than 75° C., in particular 85° C.

Binary amide copolymers based on terephthalic acid, hexamethylenediamine and ε-caprolactam, containing about 70% by weight of units derived from terephthalic acid and hexamethylenediamine, have melting points of about 300° C. and a glass transition temperature of more than 110° C.

Binary amide copolymers based on terephthalic acid, adipic acid and hexamethylenediamine (HMD) have melting points of 300° C. or higher even when they have low contents of about 55% by weight of units derived from terephthalic acid and hexamethylenediamine, the glass transition temperature not being quite as high as in the case of binary amide copolymers which contain ε-caprolactam instead of adipic acid or adipic acid/HMD.

The partly aromatic amide copolymers A) can be prepared, for example, by the process described in EP-A 129 195 and EP-A 129 196.

In this process, an aqueous solution of the monomers, ie. in this case the monomers which form the units a$_1$) to a$_3$), is heated to 250°-300° C. under superatmospheric pressure with simultaneous evaporation of water and formation of a prepolymer, the prepolymers and vapors are then continuously separated, the vapors are rectified and the entrained diamines are recycled. Finally, the prepolymer is fed into a polycondensation zone and is subjected to polycondensation under 1.10 bar gage pressure and at 250°-300° C. In the process, it is essential that the aqueous salt solution is heated under 1-10 bar gage pressure during a residence time of less than 60 seconds, the conversion advantageously being not less than 93% and the water content of the prepolymer not more than 7% by weight when the mixture leaves the evaporator zone.

As a result of these short residence times, the formation of triamines is substantially prevented, so that the partly aromatic amide copolymers A) generally have triamine contents of, preferably, less than 0.5, in particular less than 0.3%, by weight. High triamine contents can lead to a deterioration in the product quality and to problems during the continuous preparation of the partly aromatic amide copolymers. A particular example of a triamine which can cause such problems is dihexamethylenetriamine, which is formed from the hexamethylenediamine used as a monomer.

The aqueous solutions used generally have a monomer content of 30-70, in particular 40-65%, by weight.

The aqueous salt solution is advantageously passed continuously at 50°-100° C. into an evaporator zone, where the aqueous salt solution is heated under 1-10, preferably 2-6, bar gage pressure to 250°-330° C. Of course, the temperature used is above the melting point of the particular polyamide to be prepared.

As stated above, it is essential that the residence time in the evaporator zone is not more than 60, preferably 10-55, in particular 10-40, seconds.

The conversion on leaving the evaporator zone is advantageously not less than 93%, preferably 95-98%, and the water content is preferably 2-5, in particular 1-3%, by weight.

The evaporator zone is advantageously in the form of a tube bundle. Tube bundles in which the cross-section of the individual tubes is alternately tubular and slot-like have proven particularly suitable.

It has also proven advantageous for the mixture of the prepolymer and the vapor to be passed through a tubular mass transfer zone provided with baffles, before separation of the phases, directly downstream of the evaporator zone. The temperatures and pressure conditions used in the evaporator zone are maintained here. The baffles, for example packing, such as Raschig rings, metal rings, or, in particular, packing consisting of wire mesh, provide a large surface area. Consequently, the phases, ie. prepolymer and vapor, are brought into intimate contact with one another. As a result, the amount of diamine liberated with steam is considerably reduced. As a rule, a residence time of from 1 to 15 minutes is maintained in the mass transfer zone, which is advantageously in the form of a tube bundle.

The two-phase mixture, consisting of steam and prepolymer, emerging from the evaporator zone or mass transfer zone is separated. As a rule, separation takes place automatically in a vessel, owing to the physical differences, the lower part of the vessel advantageously being in the form of a polymerization zone. The vapors liberated essentially consist of steam and diamines, which are liberated when the water is evaporated. These vapors are passed into a column and rectified. Examples of suitable columns are packed columns, bubble-cap columns and sieve-tray columns having from 5 to 15 theoretical plates. The column is advantageously operated under pressure conditions identical to those in the evaporator zone. The diamines present in the vapors are separated off here and recycled to the evaporator zone. It is also possible to recycle the diamines to the downstream polymerization zone. The rectified steam obtained is removed at the top of the column.

The resulting prepolymer, which, depending on its conversion, essentially consists of low molecular weight polyamide and may contain residual amounts of unconverted salts and as a rule has a relative viscosity of 1.2-1.7, is passed into a polymerization zone. In the polymerization zone, the melt obtained is subjected to polycondensation at 250°-330° C., in particular 270°-310° C., and under 1-10, in particular 2-6, bar gage pressure. Advantageously, the vapors liberated here are rectified together with the abovementioned vapors in the column; a residence time of 5-30 minutes is preferably maintained in the polycondensation zone. The resulting polyamide, which as a rule has a relative viscosity of 1.2-2.3, is removed continuously from the condensation zone.

In a preferred procedure, the polyamide thus obtained is passed in molten form through a discharge zone with simultaneous removal of the residual water present in the melt. Examples of suitable discharge zones are devolatilization extruders. The melt freed from water in this manner is then extruded and the extrudates are granulated. The granules obtained are advantageously condensed to the desired viscosity in the solid phase by means of superheated steam at a temperature below the melting point, for example 170°-240° C. The steam obtained at the top of the column is advantageously used for this purpose.

The relative viscosity, measured in 1% strength solution (1 g/100 ml) in 96% strength by weight $H_2SO_4$ at 23° C., is generally 2.2-5.0, preferably 2.3-4.5, after the solid-phase postcondensation.

In another preferred procedure, the polyamide melt discharged from the polycondensation zone is passed into a further polycondensation zone, where it is condensed to the desired viscosity with continuous formation of new surfaces at from 285° to 310° C., advantageously under reduced pressure, for example 1-500 mbar. Suitable apparatuses are known as finishers.

Another process which resembles the one described above is described in EP-A 129 196, to which reference is made here for further details of the process.

The novel thermoplastic molding materials contain, as component B), 2-80, preferably 5-50, in particular 10-40%, by weight, based on the total weight of the components A)-D), of a partly crystalline thermoplastic polyamide which differs from A).

Partly crystalline linear polyamides, for example those having a relative viscosity of 2.2 to 4.5, measured in 1% strength solution (1 g/100 ml) in 96% strength by weight sulfuric acid at 23° C., are suitable. Polyamides derived from lactams having from 7 to 13 ring members, such as polycaprolactam, polycapryllactam or polylaurolactam, and polyamides obtained by reacting dicarboxylic acids with diamines are preferred. Examples of suitable dicarboxylic acids are alkanedicarboxylic acids of 6 to 12, in particular 6 to 10, carbon atoms, in particular adipic acid.

Examples of diamines are alkanediamines of 4 to 12, in particular 4 to 8, carbon atoms, as well as m-xylylenediamine, bis-(4-aminophenyl)-methane, bis-(4-aminocyclohexyl)-methane and 2,2-bis-(4-aminophenyl)propane and mixtures of these.

It is also possible, and sometimes advantageous, to use blends of the stated polyamides. Nylon 6 (polycaprolactam), nylon 66 (polyhexamethyleneadipamide) and polyamides containing not less than 80% by weight of repeating units of the formula

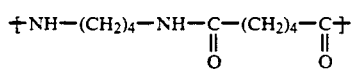

have become particularly important industrially.

The last-mentioned polyamides are obtainable, for example, by condensation of 1,4-diaminobutane with adipic acid at elevated temperatures. Processes for the preparation of polyamides having this structure are described in, for example, EP-A-38 094, EP-A-38 582 and EP-A-39 524.

The novel thermoplastic molding materials may contain, as a further component C), a rubber impact modifier (elastomer) in an amount of not more than 50, preferably from 2 to 40, in particular 5 to 30%, by weight.

Elastomers based on ethylene, propylene, butadiene or acrylate or a mixture of these monomers may be mentioned merely as examples of rubber impact modifiers.

Polymers of this type are described in, for example, Houben-Weyl, Methoden der organischen Chemie, Vol. 14/1 (Georg-Thieme-Verlag, Stuttgart, 1961), pages 392-406, and in the monograph by C. B. Bucknall, Toughened Plastics (Applied Science Publishers, London, 1977).

Some preferred types of such elastomers are described below.

A first preferred group comprises the ethylene/propylene (EP) and ethylene/propylene/diene (EPDM) rubbers, which preferably have a ratio of ethylene radicals to propylene radicals of from 40:60 to 65:35.

The Mooney viscosities (MLI+4/100° C.) of such uncrosslinked EP and EPDM rubbers (gel contents generally less than 1% by weight) are preferably from 25 to 100, in particular from 35 to 90 (measured using the large rotor after a running time of 4 minutes at 100° C. according to DIN 53,523).

EP rubbers generally have virtually no double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes of 5 to 25 carbon atoms, such as 1,4-butadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo-(5.2.1.0.2.6)-3,8-decadiene, or mixtures of these. 1,5-hexadiene, 5-ethylidenenorbornene and dicyclopentadiene are preferred. The diene content of the EPDM rubbers is preferably from 0.5 to 10, in particular from 1 to 8%, by weight, based on the total weight of the rubber.

EP and EPDM rubbers can also be grafted with reactive carboxylic acids or their derivatives. Acrylic acid, methacrylic acid and their derivatives and maleic anhydride may be mentioned here merely as typical examples.

Another group of preferred rubbers comprises copolymers of ethylene with acrylates and/or methacrylates, in particular those which additionally contain epoxy groups. These epoxy groups are preferably incorporated into the rubber by adding to the monomer mixture epoxy-containing monomers of the general formula II or III

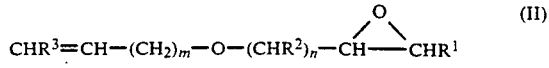

-continued

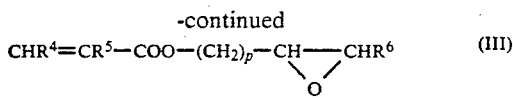

where $R^1$, $R^2$, $R^3$, $R^4$, $R^5$ and $R^6$ are each hydrogen or alkyl of 1 to 6 carbon atoms, m is an integer of 0 to 20, n is an integer of 0 to 10 and p is an integer of 0 to 5.

$R^1$, $R^2$ and $R^3$ are each preferably hydrogen, m is preferably 0 or 1 and n is preferably 1. The corresponding compounds are preferably alkyl glycidyl ethers or vinyl glycidyl ethers.

Preferred examples of compounds of the formula III are epoxy-containing esters of acrylic acid and/or methacrylic acid, of which glycidyl acrylate and glycidyl methacrylate are particularly preferred.

The ethylene content of the copolymers is generally from 50 to 98% by weight, and the content of epoxy-containing monomers and that of the acrylate and/or methacrylate are each from 1 to 49% by weight.

Particularly preferred copolymers are those consisting of from 50 to 98, in particular from 60 to 95%, by weight of ethylene, from 0.1 to 40, in particular from 2 to 20%, by weight of glycidyl acrylate, glycidyl methacrylate, acrylic acid and/or maleic anhydride, and from 1 to 45, in particular from 10 to 35%, by weight of n-butyl acrylate and/or 2-ethylhexyl acrylate.

Other preferred esters of acrylic acid and/or methacrylic acid are the methyl, ethyl, propyl, isobutyl and tert-butyl esters.

Vinyl esters and vinyl ethers can also be used as comonomers.

The ethylene copolymers described above can be prepared by a conventional process, preferably by random copolymerization under superatmospheric pressure and at elevated temperatures. Appropriate processes are described in the literature.

The melt flow index of the ethylene copolymers is in general from 1 to 80 g/10 min (measured at 190° C. and under a load of 2.16 kg).

Other preferred elastomers (rubbers) D) are graft copolymers with butadiene, butadiene/styrene, butadiene/acrylonitrile and acrylates, as described in, for example, DE-A-16 94 173 and DE-A-23 48 377.

Particular examples of these are the ABS polymers, as described in DE-A-20 35 390, DE-A-22 48 242 and EP-A-22 216, the last-mentioned being particularly preferred.

Graft polymers of from 25 to 98% by weight of an acrylate rubber having a glass transition temperature of less than −20° C., as the grafting base, and from 2 to 75% by weight of a copolymerizable ethylenically unsaturated monomer whose homopolymers or copolymers have a transition temperature of more than 25° C., as the graft, can also be used as rubber D).

The grafting base is an acrylate or methacrylate rubber, and up to 40% by weight of further comonomers may be present. The $C_1$-$C_8$-esters of acrylic acid or methacrylic acid and their halogenated derivatives as well as aromatic acrylates and mixtures thereof are preferred. Comonomers in the grafting base are, for example, acrylonitrile, methacrylonitrile, styrene, α-methylstyrene, acrylamides, methacrylamides and vinyl $C_1$-$C_5$-alkyl ethers.

The grafting base may be uncrosslinked or partly or completely crosslinked. Crosslinking is achieved by copolymerization of preferably from 0.02 to 5, in particular from 0.05 to 2%, by weight of a crosslinking monomer having more than one double bond. Suitable crosslinking monomers are described in, for example, DE-A-27 26 256 and EP-A-50 265.

Preferred crosslinking monomers are triallyl cyanurate, triallyl isocyanurate, triacryloylhexahydro-s-triazine and trialkylbenzenes.

If the monomers used have more than 2 polymerizable double bonds, it is advantageous to limit their amount to not more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme-Verlag, Stuttgart, 1977).

Other suitable grafting bases are acrylate rubbers having a diene core, as described in, for example, EP-A-50 262.

Particularly suitable graft monomers are styrene, α-methylstyrene, acrylonitrile, methacrylonitrile and methyl methacrylate and mixtures thereof, in particular those of styrene and acrylonitrile in a weight ratio of from 90:10 to 50:50.

The grafting yield, ie. the quotient of the amount of grafted monomer and the amount of graft monomer used is in general from 20 to 80%.

Rubbers based on acrylates, which can be used according to the invention, are described in, for example, DE-A-24 44 584 and DE-A-27 26 256.

The rubbers C) preferably have a glass transition temperature of less than −30° C., in particular less than −40° C., which leads to good impact strength even at low temperatures.

Of course, it is also possible to use blends of the abovementioned elastomeric impact modifiers.

The novel molding materials may contain, as component D), not more than 60, preferably from 5 to 50%, by weight of fibrous or particulate fillers or a mixture thereof. Examples of fillers are asbestos, carbon fibers or glass fibers in the form of woven glass fabrics, glass mats or glass rovings, and wollastonite.

In addition to the components A) to D), the novel molding materials may contain conventional additives and processing assistants. The amount of these is in general not more than 20, preferably not more than 10%, by weight, based on the total weight of the components A) to D).

Examples of conventional additives are stabilizers and antioxidants, heat stabilizers, UV stabilizers, lubricants and mold release agents, colorants, such as dyes and pigments, plasticizers and flameproofing agents.

Antioxidants and heat stabilizers, which may be added to the thermoplastic materials according to the invention, are, for example, halides of metals of group I of the Periodic Table, for example sodium halides, potassium halides or lithium halides, if necessary in combination with copper(I) halides, for example chlorides, bromides or iodides. Sterically hindered phenols, hydroquinones, substituted members of this group and mixtures thereof can also be used, preferably in concentrations of not more than 1% by weight, based on the weight of the molding material. Examples of UV stabilizers are various substituted resorcinols, salicylates, benzotriazoles and benzophenones, which are used in general in amounts of not more than 2.0% by weight.

Lubricants and mold release agents, which are generally added to the thermoplastic material in amounts of not more than 1% by weight, are stearic acids, stearyl alcohol, alkyl stearates and stearamides as well as esters of pentaerythritol with long-chain fatty acids.

Red phosphorus and the other flameproofing agents known per se for partly crystalline polyamides may be mentioned here merely as examples of flameproofing agents.

The novel molding materials can be prepared by a conventional process, by mixing the starting materials in a conventional mixing apparatus, such as an extruder, a Brabender mill or a Banbury mill, and then extruding the mixture. After the extrusion, the extrudates are cooled and comminuted. The mixing temperatures are in general from 280° to 350° C.

It is in principle also possible, and sometimes advantageous, first to mix the low molecular weight components A) and B) and then to carry out solid-phase postcondensation.

The novel molding materials have a good property profile, in particular good rigidity, and are therefore suitable for the production of moldings of all types, fibers and films.

EXAMPLES

The following components were used:

Component A

The preparation was carried out according to European Patent 129 195.

An aqueous solution, consisting of 35 kg of ε-caprolactam, 55 kg of terephthalic acid, 38.5 kg of hexamethylenediamine and 128.5 kg of water was conveyed from a heated stock vessel at about 80° C. at a rate corresponding to an amount of polyamide of 5 kg/hour, by means of a metering pump, into a partly horizontal and partly vertical tubular evaporator. The evaporator was heated with a liquid heating medium which had a temperature of 295° C., with vigorous circulation. The evaporator had a length of 3 m, a capacity of 180 ml and a heat-transfer surface of about 1,300 cm². The residence time in the evaporator was 50 sec. The prepolymer/steam mixture emerging from the evaporator had a temperature of 290° C. and was separated into steam and melt in a separator. The melt remained in the separator for a further 10 minutes and was then extruded by means of an extruder having a devolatilization zone, and the extrudates were consolidated in a water bath and then granulated. The separator and the evaporator zone were kept under a pressure of 5 bar by means of a pressure regulating means which was arranged downstream of the column. The steam separated off in the separator was passed into a packed column which had about 10 theoretical plates and into which about 1 l of vapor condensate per hour was introduced at the top to produce a reflux. A temperature of 152° C. was established at the top of the column. The steam emerging from the let-down valve was condensed and contained less than 0.5% by weight of hexamethylenediamine and less than 0.1% by weight of ε-caprolactam. The bottom product obtained was an aqueous solution of hexamethylenediamine, which contained 80% by weight of hexamethylenediamine and from 1 to 3% by weight of ε-caprolactam, based in each case on the polyamide produced. This solution was added to the starting salt solution by means of a pump, once again upstream of the evaporator inlet.

Downstream of the evaporator, the prepolymer had a relative viscosity of 1.25, measured in 96% strength by weight sulfuric acid at 20° C., and, according to terminal group analysis, had a conversion of from 93 to 95%. The content of bishexamethylenetriamine was from 0.1 to 0.15% by weight, based on polyamide.

After the polymer melt had emerged from the separator, the polyamide had a very pale natural color and an extremely low content of bishexamethylenetriamine of 0.17% and a relative viscosity of from 1.65 to 1.80.

The product had roughly equivalent amounts of terminal carboxyl and amino groups.

The content of extractables (extraction with methanol) was from 3.1 to 3.3% by weight.

In the extruder, the melt was then let down to atmospheric pressure, there being virtually no further condensation during a residence time of less than 1 minute. The granules obtained were condensed to a final viscosity η rel of 2.50 by continuous solid-phase condensation with superheated steam at 195° C. during a residence time of 30 hours. The content of extractables was then 0.2% by weight (methanol extraction).

Component B

B/1 Polyhexamethyleneadipamide having a relative viscosity of 2.6, measured in 96% strength by weight $H_2SO_4$ (1 g/100 ml) at 23° C. (Ultramid® A3 from BASF AG)

B/2 Poly-ε-caprolactam having a relative viscosity of 2.7, measured as for B/1 (Ultramid® B3 from BASF AG)

B/3 Polytetramethyleneadipamide having a relative viscosity of 3.8, measured as for B/1 (Stanyl® TS 300 from DSM)

Components A and B were melted in a twin-screw extruder at 320° and extruded, and the extrudates were granulated. The granules were injection molded to produce moldings for determining the modulus of elasticity (according to DIN 53,452) and the yield stress according to DIN 53,455.

The composition of the blends and the results of the measurements are shown in the Table.

TABLE

| | (all percentages are % by weight) | | | | | | | |
|---|---|---|---|---|---|---|---|---|
| Example | 1V | 2V | 3V | 4V | 5 | 6 | 7 | 8 |
| Component A (% by weight) | 100 | — | — | — | 95 | 80 | 90 | 90 |
| Component B (% by weight) | — | 100 B/1 | 100 B/2 | 100 B/3 | 5 B/1 | 20 B/1 | 10 B/2 | 10 B/3 |
| Modulus of elasticity [N/mm²] | 2940 | 3200 | 3000 | 3050 | 3350 | 3300 | 3500 | 3460 |
| Yield stress | 85 | 80 | 80 | 80 | 110 | 105 | 108 | 100 |

TABLE -continued

| | (all percentages are % by weight) | | | | | | | |
|---|---|---|---|---|---|---|---|---|
| Example | IV | 2V | 3V | 4V | 5 | 6 | 7 | 8 |
| [N/mm²] | | | | | | | | |

The results show that the modulus of elasticity and the yield stress of the novel blends are higher than the values for the individual components.

We claim:

1. A thermoplastic molding material containing, as essential components,
    A) 20–98% by weight of a partly aromatic amide copolymer essentially consisting of
        $a_1$) 60–75% by weight of units derived from terephthalic acid and hexamethylenediamine, and
        $a_2$) 25–40% by weight of units derived from ε-caprolactam,
    B) 2–80% by weight of a partly crystalline thermoplastic polyamide which differs from A)
and furthermore
    C) 0–50% by weight of an elastomeric impact modifier and
    D) 0–50% by weight of fibrous or particulate fillers or a mixture of these.

2. A thermoplastic molding material as claimed in claim 1, wherein the partly aromatic amide copolymer A) has a triamine content of less than 0.5% by weight.

3. A thermoplastic molding material as claimed in claim 1, wherein the polyamide B) is poly-ε-caprolactam, polytetramethyleneadipamide or polyhexamethyleneadipamide or a mixture thereof.

4. A molding obtained from a thermoplastic molding material as claimed in claim 1 as an essential component.

5. A thermoplastic molding material as claimed in claim 1, wherein the partly aromatic amide copolymer A) has a melting point of from 260° C. to above 300° C.

* * * * *